March 22, 1932.  E. G. BAHL  1,850,490
AIRPORT
Original Filed Feb. 4, 1930

Inventor.
Errold G. Bahl.
by
Lockwood & Lockwood,
His Attorneys

Patented Mar. 22, 1932

1,850,490

UNITED STATES PATENT OFFICE

ERROLD G. BAHL, OF LOS ANGELES, CALIFORNIA; GLADYS BAHL EXECUTRIX OF SAID ERROLD G. BAHL, DECEASED

AIRPORT

Application filed February 4, 1930, Serial No. 425,798. Renewed December 19, 1931.

An object of this invention is to increase the capacity of an airport by enabling airplanes to take off independently of and without waiting for other airplanes to land. The growth of airplane business at this time is so rapidly increasing that airports heretofore used are becoming inadequate and it is frequent at airports having a large volume of business that airplanes are greatly delayed from taking off because of being required to wait on constantly landing airplanes. In other words existing airports are not arranged for airplanes to safely land and take off at the same time so that both the landing and taking off of airplanes can be continuous.

The chief feature of this invention, therefore, consists in arranging taking off and landing runways in pairs, one runway of each pair being for landing and the other for taking off and the runways of each pair being parallel and spaced from each other so that both runways of each pair can be safely used at the same time.

Another object of this invention is to clearly indicate to aviators in the sky as well as on the ground which runway of each pair is for landing and which one for taking off, so as to avoid confusion, interference and collision when the two kinds of runways are simultaneously used. This is done by means of upwardly reflecting light of different colors for the two different kinds of runways or other suitable means for differentiating the two kinds of runways. When thus differentiated, no airplane would land on the taking off runway and no aviator would take off on a landing runway.

Another feature of the invention consists in a system of said pairs of parallel taking off and landing runways extending in different directions, preferably in the general directions of the compass, so that an airplane can take the proper runway to take off or land against the wind. This is a very important consideration and the system herein set forth presents a wide choice of runways for use according to the direction of the wind.

Another feature of the invention consists in a system of straight runways and curved taxi-ways connecting them so as to furnish ready access to and communicate with all the runways. To that end the ends of all runways are connected with each other by curved taxi-ways. Where the runways and taxi-ways cross, the crossing is provided with block signals to prevent accident.

The full nature of the invention will be understood from the accompanying description and claims and the drawings.

Figure 1:
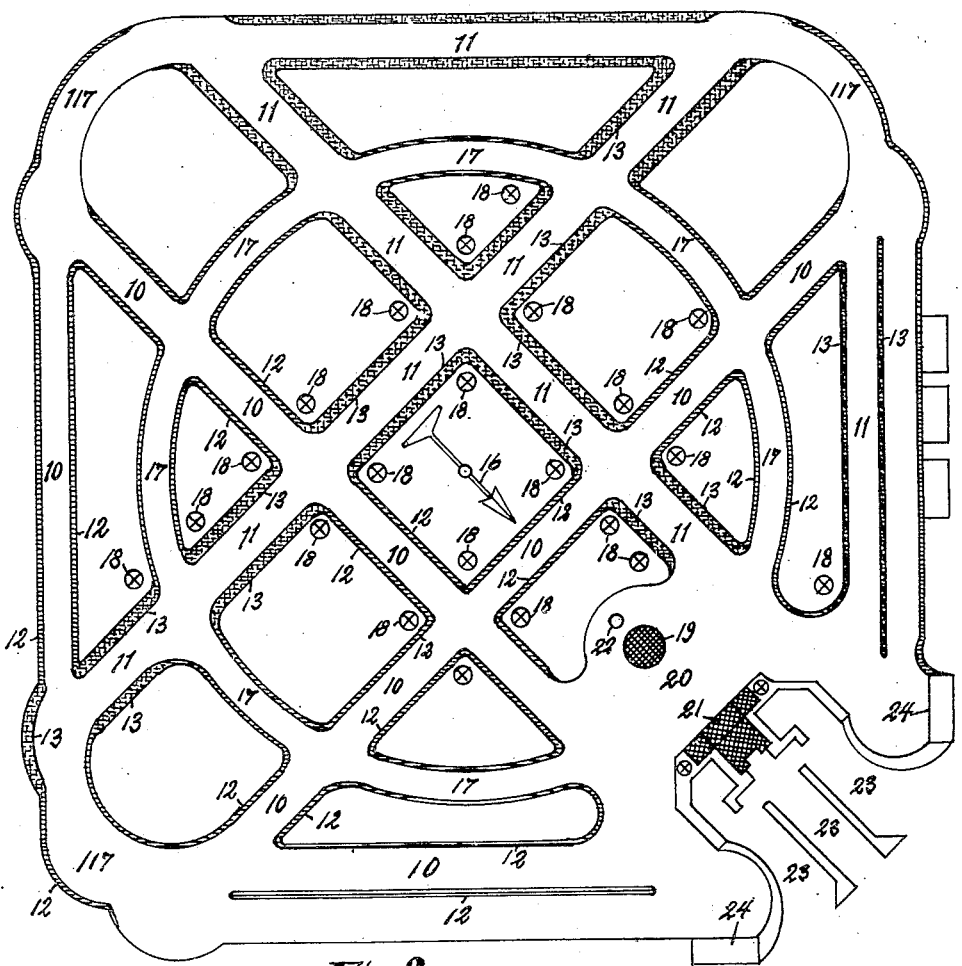
Fig. 1 is a plan view of the airport.
Figure 2:
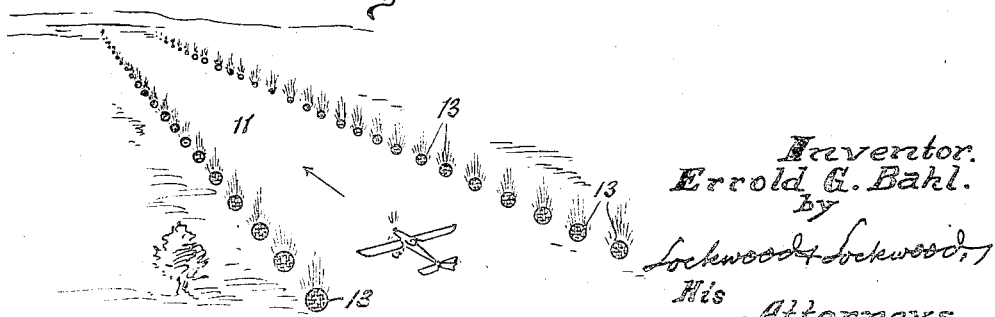
Fig. 2 is a perspective view of a runway with upwardly reflecting lights located beside the runways.

The airport shown herein is rectangular, although that form is not necessary to the main features of this invention.

The taking off runway 10 and the landing runway 11, parallel with each other and spaced apart, constitute a pair of runways, one for taking off and the other for landing, and capable of simultaneous use without difficulty or confusion. The runways are usually more than one hundred feet wide so that there is several hundred feet of space between the runways constituting the pair of runways as above specified.

The taking off and landing runways constituting said pair are distinguished from each other by an aviator in the sky or one on the ground by suitable distinguishing means 12, as upwardly reflecting lights 13, along the margin of the runways.

Yellow lights and distinguishing means indicate the landing runway, while blue lights and distinguishing means or some other color indicate the taking off runway.

An important feature of the invention lies in the system of runways shown in the drawings wherein there is a plurality of said pairs of runways. Two of said pairs of runways are arranged diagonally of the airport and cross each other, as shown, while two other pairs of said parallel runways are located at the sides of the airport, as shown. This system of pairs of runways enables the runways to be selected so as to take off or land against the wind.

Said pairs of runways are preferably arranged in line with the general directions of the compass, as north, south, east, west, northeast, and northwest.

An enormous arrow weather-vane 16 is preferably located at the center of the field for indicating the direction of the wind. It is several hundred feet long so as to be visible from the sky.

The runways are all straight and they are rendered readily accessible by taxi-ways which are all curved, and hence are distinguishable from the runways.

There is shown a circular taxi-way 17 that intersects all of the diagonal runways, and the ends of the runways are all connected by curved taxi-ways 117. Block signals 18 are provided at the various crossings of the runways and taxi-ways to keep the taking off runways and landing runways clear when either is being or about to be used. These signals may be controlled by means from the airplane or by the operator in control of the airport.

An operator's headquarters 19 is located in a plaza 20 in front of a loading station or depot 21, preferably at the margins of the airport, but always between a pair of runways if extended, whereby access from the outside to airplanes will not interfere with the parallel runways. 22 is the oil station and 23 are the entrances to the airport, and 24 freight depots.

With the arrangement thus presented in this system of runways, it is evident that airplanes can take off and land at the same time without interference by using parallel runways, one for landing and one for taking off, and in the system of runways herein shown there is a taking off runway and a landing runway in line with each general direction of the compass.

Also the taxi-ways enable airplanes to readily move to or away from any particular runway and in front of the station or depot and different kinds of runways are indicated by different colored lights and the crossings protected by block signals and these under control of an operator at headquarters.

This arrangement of airports greatly increases the capacity of the airport and also the convenience in taking off and landing against the wind and the airport is enabled to successfully meet the requirements of the rapidly growing airplane business in this country.

I claim as my invention:

1. An airport including a pair of parallel runways, one runway for taking off and the other for landing, and means for differentiating said two runways that are visible to aviators in the sky as well as on the ground, so that airplanes can take off at any time without waiting for airplanes to land.

2. An airport including a pair of parallel runways, one runway for taking off and the other for landing, and upwardly reflecting lights of one color along each side of the landing runway and upwardly reflecting lights of another color along each side of the taking off runway.

3. An airport including a system of pairs of parallel landing and taking off runways, there being one pair extending in each general direction of the compass, and means for differentiating the two kinds of runways which are visible to aviators in the sky as well as on the ground, whereby the airplanes may always take off or land against the wind.

4. An airport including a system of rectangular form with a pair of parallel landing and taking off runways, one runway of a pair arranged at a side of the system and other pairs extending diagonally thereof, and means for differentiating the two kinds of runways that are visible to aviators in the sky as well as on the ground.

5. An airport including a plurality of pairs of parallel landing and taking off runways crossing each other, means for differentiating the two kinds of runways that are visible to aviators in the sky as well as on the ground, and block signals at the crossings of said runways.

6. An airport including a plurality of pairs of parallel landing and taking off runways which cross each other, a substantially circular taxi-way crossing said runways, and means for differentiating the two kinds of runways that are visible to aviators in the sky as well as on the ground.

7. An airport including a plurality of pairs of parallel landing and taking off runways which cross each other, a substantially circular taxi-way crossing said runways, means for differentiating the two kinds of runways that are visible to aviators in the sky as well as on the ground, and block signals at the crossings of said runways and taxi-ways.

8. An airport including a system of substantially parallel landing and taking off runways oppositely located in pairs there being one pair extending in each general direction of the compass, means for differentiating the two kinds of runways which are visible to aviators in the sky as well as on the ground, and a weather indicator visible from the sky as well as the ground being located substantially at the center of the system and between parallel runways.

In witness whereof, I have hereunto affixed my signature.

ERROLD G. BAHL.